Figure 1:
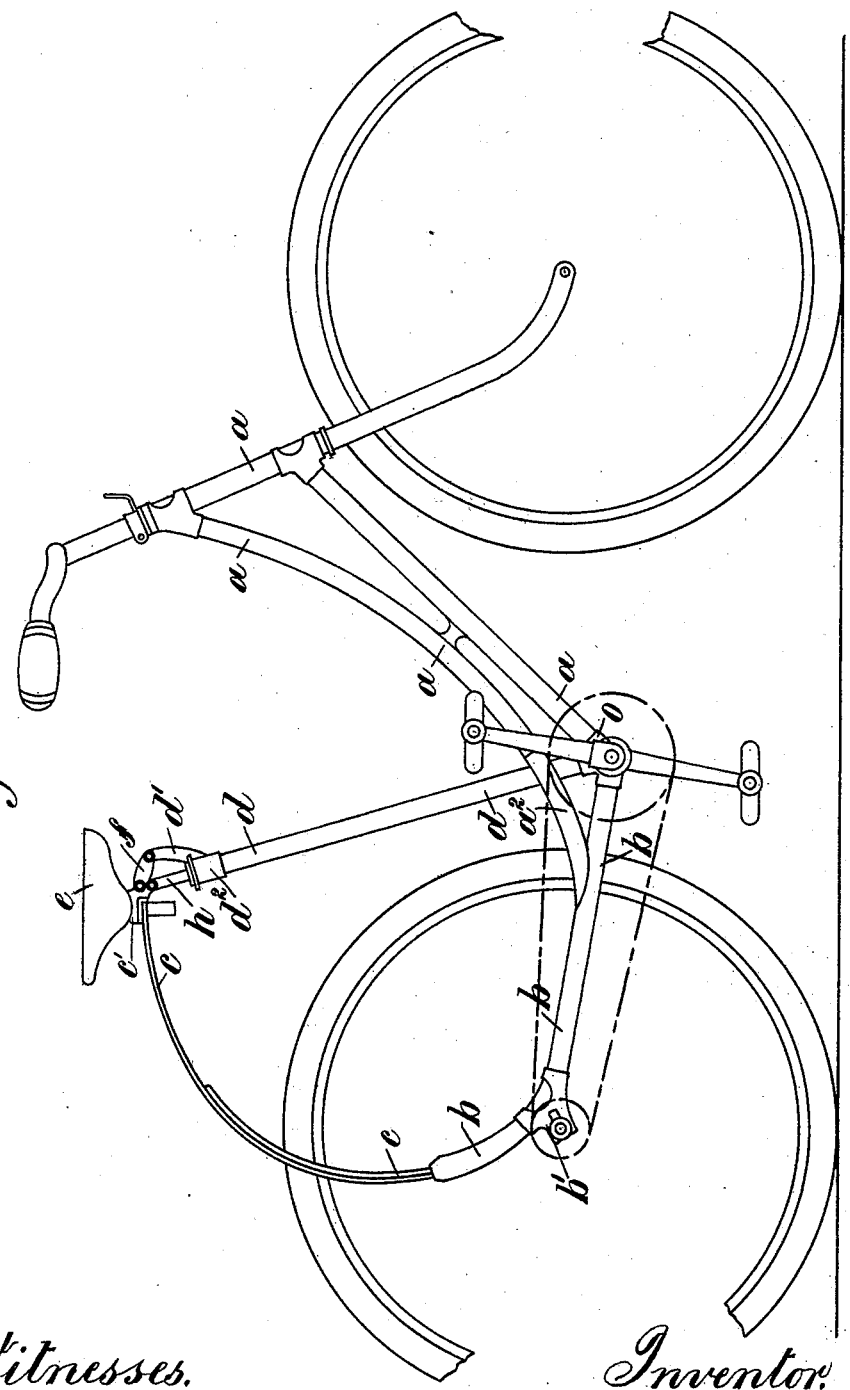

(No Model.) 2 Sheets—Sheet 1.

E. R. ROYSTON.
VELOCIPEDE.

No. 606,302. Patented June 28, 1898.

Witnesses.
E. R. Rolton
[signature]

Inventor.
Ernest Richard Royston
By [signature]
his Attorneys.

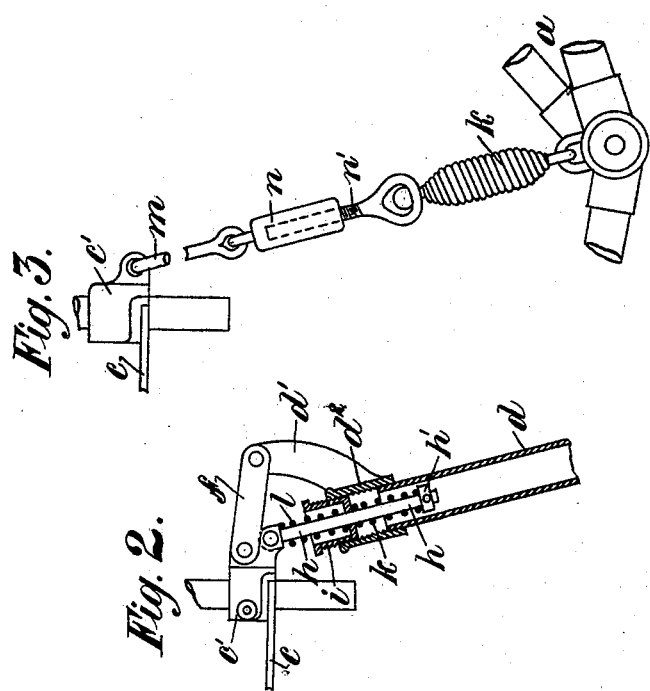

UNITED STATES PATENT OFFICE.

ERNEST R. ROYSTON, OF LIVERPOOL, ENGLAND.

VELOCIPEDE.

SPECIFICATION forming part of Letters Patent No. 606,302, dated June 28, 1898.

Application filed April 29, 1898. Serial No. 679,203. (No model.)

*To all whom it may concern:*

Be it known that I, ERNEST R. ROYSTON, engineer, residing at Liverpool, in the county of Lancaster, England, have invented Improvements in Velocipedes, of which the following is a specification.

This invention has reference to velocipedes, and particularly to bicycles of the kind in which the frames consist of a rigid part and a spring part and the saddle is supported or carried upon the spring portion.

In the drawings hereto annexed the invention is illustrated.

Figure 1 shows a complete bicycle in side elevation provided with improvements under the invention. Fig. 2 is a detail in section of a part of the bicycle shown in Fig. 1, and Fig. 3 shows a modification under the invention.

Referring to the drawings, and more particularly to Figs. 1 and 2, the frame shown comprises a rigid tubular portion consisting of the tubes $a$ between the front wheel and fork and the crank-shaft bracket $o$, and the fork-tubes $b$ between this bracket and the rear-wheel connection at $b'$, (the fork-tubes being carried up beyond this point in this case,) flat springs fixed in the ends of the tubes $b$, carried up and forward, as shown, and carrying the saddle $e$ at their ends, and a stay between the ends of the spring $c$ and the frame $a$, (or may be $b$,) by which they (the springs) are controlled and held under tension. In the case shown this stay or part comprises two features—namely, it is adapted to hold the spring $c$ down under a certain degree of tension or stress and also to act as a support and guide to the spring, preventing side or longitudinal oscillations or movements thereof or its moving in any but the required directions. It consists partly of a tubular standard $d$, rigidly fastened at its base to the upper and lower tubes $a\ a$ in any known suitable way, while at its upper end it is provided with a projecting arm $d'$, the upper end of which is connected with the saddle-pillar support $c'$ on the end of the springs $c$ by a rigid link or connection $f$, hinged to $d'$ and $c'$. This link or connection, obtaining its support from the rigid standard $d$, prevents the spring $c$ from moving laterally or longitudinally—that is, in any other direction but the up-and-down one. Then a further connection between the springs $c$ and the standard $d$ is effected by a rod $h$, which is connected at one end to the saddle-pillar support $c'$ and passes through a gland or nut $i$, which screws into the internally-threaded neck $d^2$ on the standard $d$, and between the under side of this gland and a collar or nut $h'$ on the end of $h$ the spring $k$ is provided. This spring normally will be in compression, and by screwing the gland $i$ down into the neck $d^2$ more or less the strain or compression on the spring $k$ can be varied. It will thus be seen that by means of this tie or stay a constant tension on the springs $c$ is obtained, and this tension should be such that when the rider's weight is put on the springs they will not give way under him, but will just about carry him, while the spring $k$ serves to prevent any sudden jar coming on the springs $c$, and hence to the rider, in their return after they have been in action—that is to say, after the wheel has passed over an unevenness or projection in the road and the different parts—viz., the saddle $e$ and the frame—resume their normal relative positions. This controlling means also, beyond the effect above specified, prevents the movement up and down of the saddle $e$ when riding and when relieving the springs of the weight of the rider more or less in pressing on the pedals.

In some cases, as shown in Fig. 2, a spring is interposed between the end of the spring $c$ and a base or part on or connected with the stay $d$, so as to assist substantially in supporting the weight of the rider. This spring in Fig. 2 is designated $l$ and is of spiral form interposed between the fitting $c'$ and the gland $i$. When such a spring is used, the springs $c$ may be of relatively light and weak structure.

The springs $c$ shown are fixed in the ends of the fork-tubes $b$ and are of flat form, and they are preferably brought close together at their upper ends and riveted or otherwise suitably fastened to the saddle-pillar holder $c'$, they being of such a strength and thickness as together will support the weight of the rider and of such width as to prevent lateral movement.

In the cycle shown, which is a woman's pattern or type, (but which of course can also be used by men,) the upper frame-tube $a$ is shown with a short supplemental forked portion $a^2$ extending from the part where the standard $d$ is secured to it to the frame-forks $b$, to which it could be hinged.

In the modification shown in Fig. 3 the stay connecting the spring $c$ with the frame $a$ is a tension one. In this case the part $m$ consists of a rod, tube, or cord secured to the saddle-pillar support $c'$ and having at its lower ends an adjusting device consisting of an internally-threaded socket-piece $n$, fastened to $m$, and an externally-threaded bolt or pin $n'$, screwing into $n$ and connected at its lower end with the end of the spring $k$, the lower end of which is secured to the bicycle-frame $a$. The joint between the end of $n'$ and the spring $k$ is of the swivel type, so that the rod $n'$ can be screwed into and out of the socket end without disconnecting. By this means the tension required on the springs $c$ is obtained and can be adjusted to any degree desired by the adjusting device, while the spring $k$ serves to obviate sudden stoppage or jerking action of the contrivances or parts when coming back to their normal position after having been in action. In the case of a man's type of bicycle the standard connected with the frame for preventing lateral or longitudinal movement of the springs $c$ may be carried from the front portion of the frame $a$ horizontally and from the lower portion of the frame, as shown in Fig. 1, forming an angular standard on the frame $a$.

What is claimed in respect of the herein-described invention is—

1. In a spring-frame safety-bicycle, a rigid tubular frame portion $a\,b$, extending between the front portion and the rear-wheel axle; springs $c$ on and extending from the rear end of the tubes $b$ of said rigid portion, to a point above and forward of the rear-wheel axle, and carrying at this point the saddle; and a tension-tie connecting the end of the springs $c$ with the rigid frame, at a point intermediate the front and rear portions of this frame, and normally holding said springs down under stress to carry the rider without bending, and providing freedom of movement vertically downward to the ends of said springs; substantially as set forth.

2. In a spring-frame safety-bicycle, a rigid tubular frame portion $a\,b$ extending between the front portion and the rear-wheel axle; springs $c$ on and extending from the rear end of the tubes $b$ of said rigid portion, to a point above and forward of the rear-wheel axle, and carrying at this point the saddle; and a tie connecting said springs $c$ with the frame $a\,b$ at a point intermediate the front and rear portion of this frame, consisting of a tube $d$ rigidly fixed at its lower end to the frame, and extending up toward the spring end, and connected at its upper end by a free connection to the springs' ends, whereby movement of said springs in the horizontal plane, longitudinally or laterally, is prevented, and free movement, vertically, afforded; substantially as set forth.

3. The bicycle comprising the rigid tubular frame $a\,b$, springs $c$, fixed on the ends of the tubes $b$ and extending up and forward, and supporting the saddle $e$; the tubes $d$ rigidly connected and mounted in the lower part of the frame, and extended up to near the free end of the springs $c$, a connecting-link $f$, hinged on the upper part of $d$, and having movement in the vertical plane, about said hinge, and a spring $k'$, and rod $h$ in the upper end of the tube $b$, by which the constant tension on the springs $c$ downward is maintained.

4. The combination with the spring $c$ and the frame $a\,b$, of the tube $d$; link $f$, connecting the tube $d$ with the end of the spring $c$; the rod $h$ connected to the springs $c$, and extending down within the tube $d$; the adjusting-screw plug $i$ in the upper end of $d$; the spring $k'$ between the under side of the plug $i$, and the end of the rod $h$, pressing said rod $h$ and spring $c$ down, under constant tension; as set forth.

In witness whereof I have hereunto set my hand in presence of two witnesses.

ERNEST R. ROYSTON.

Witnesses:
 JOHN H. WALKER,
 WILLIAM I. HUMPHRIES.